United States Patent
Finley et al.

(10) Patent No.: US 12,435,583 B1
(45) Date of Patent: *Oct. 7, 2025

(54) SYSTEM AND METHOD FOR MONITORING AND MAINTAINING HYDROSTATIC PRESSURE DURING TRIPPING OPERATIONS, STRIPPING OPERATIONS, AND AXIAL PIPE OPERATIONS

(71) Applicant: PRUITT TOOL & SUPPLY CO., Fort Smith, AR (US)

(72) Inventors: Jason Finley, Greenwood, AR (US); Don Hannegan, Fort Smith, AR (US); John Thomas Stites, III, Salisaw, OK (US); Benjamin Micah Spahn, Alma, AR (US)

(73) Assignee: PRUITT TOOL & SUPPLY CO., Fort Smith, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/656,016

(22) Filed: May 6, 2024

Related U.S. Application Data

(63) Continuation of application No. 17/953,122, filed on Sep. 26, 2022, now Pat. No. 11,976,523, which is a continuation of application No. 16/711,222, filed on Dec. 11, 2019, now Pat. No. 11,454,073.

(60) Provisional application No. 62/778,182, filed on Dec. 11, 2018.

(51) Int. Cl.
*E21B 21/08* (2006.01)
*E21B 21/10* (2006.01)
*E21B 33/08* (2006.01)
*E21B 19/16* (2006.01)

(52) U.S. Cl.
CPC ............ *E21B 21/08* (2013.01); *E21B 21/106* (2013.01); *E21B 33/085* (2013.01); *E21B 19/16* (2013.01)

(58) Field of Classification Search
None
See application file for complete search history.

(56) References Cited

U.S. PATENT DOCUMENTS

| | | | | |
|---|---|---|---|---|
| 4,282,939 | A * | 8/1981 | Maus | E21B 21/08 175/48 |
| 6,257,354 | B1 * | 7/2001 | Schrader | E21B 21/08 175/48 |
| 11,976,523 | B1 * | 5/2024 | Finley | E21B 33/085 |
| 2018/0328159 | A1 * | 11/2018 | Mandava | E21B 47/10 |
| 2019/0390525 | A1 * | 12/2019 | Keith | E21B 21/08 |

* cited by examiner

*Primary Examiner* — Giovanna Wright
(74) *Attorney, Agent, or Firm* — Schrantz Law Firm, PLLC; Stephen D. Schrantz

(57) ABSTRACT

The trip system closely monitors and ensures that the hydrostatic pressure of the wellbore stays consistent throughout the tripping process, stripping process, and axial pipe operations. The core components of the system include, but are not limited to, an advanced automation system that controls a back-pressure device, including but not limited to a choke, a rotary ball valve, or other flow control devices. The automation system also monitors upstream and downstream flow measurement components. The trip system also provides a pump system to circulate drilling fluid from the trip tank across the top of the wellhead and/or at a lower portion below the RCD.

19 Claims, 5 Drawing Sheets

SYSTEM AND METHOD FOR MONITORING AND MAINTAINING HYDROSTATIC PRESSURE DURING TRIPPING OPERATIONS, STRIPPING OPERATIONS, AND AXIAL PIPE OPERATIONS

CROSS-REFERENCE TO RELATED APPLICATIONS

This application claims priority to and is a continuation of U.S. patent application Ser. No. 17/953,122 entitled SYSTEM AND METHOD FOR MONITORING AND MAINTAINING HYDROSTATIC PRESSURE DURING TRIPPING OPERATIONS, STRIPPING OPERATIONS, AND AXIAL PIPE OPERATIONS filed on Sep. 26, 2022 that is a continuation of U.S. patent application Ser. No. 16/711,222 entitled SYSTEM AND METHOD FOR MONITORING AND MAINTAINING HYDROSTATIC PRESSURE DURING TRIPPING OPERATIONS, STRIPPING OPERATIONS, AND AXIAL PIPE OPERATIONS filed on Dec. 11, 2019 that issued as U.S. Pat. No. 11,454,073 on Sep. 27, 2022 that is a continuation of U.S. Patent Application No. 62/778,182 entitled SYSTEM AND METHOD FOR MONITORING AND MAINTAINING HYDROSTATIC PRESSURE DURING TRIPPING OPERATIONS, STRIPPING OPERATIONS, AND AXIAL PIPE OPERATIONS filed on Dec. 11, 2018, all of which are hereby incorporated by reference.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention is related to a tripping system in a drilling operation. More specifically, the present invention is related to a tripping system for maintaining wellhead pressure. The present invention monitors the upstream and downstream flow measurements of drilling fluid through the wellhead. The present invention provides a back pressure device for maintaining wellhead pressure to alleviate pressure deviations. The present invention also prescribes the rate of movement of the pipe within the well.

A pipe trip, also known as tripping pipe, is the act of pulling the drill string out of the hole or replacing it in the hole. This is a common operation used in the drilling practice for many different reasons such as:

Damaged or worn out drill bit;
Modification to Bottom Hole Assembly (BHA);
Drilling operation has been completed;
To clean up the sides of open hole (Wiper Trip); and
Running casing.

The act of replacing drill string into the wellbore when the blowout preventers (BOPs) are closed and pressure is contained in the well is a procedure known as stripping pipe. This procedure is required when the hydrostatic overbalance pressure of the wellbore has been compromised and an influx has been detected.

Both tripping and stripping pipe rely heavily on monitoring the hydrostatic pressure of the wellbore. This hydrostatic pressure is determined by the weight of the drilling fluid column and total vertical depth of the wellbore. Before the tripping process can take place, the correct weight of the drilling fluid must be determined and circulated throughout the wellbore to prevent an influx or fracture of the well. During circulation of the desired weight drilling fluid, the remaining cuttings from the drilling process will be carried out of the well and processed by the mud cleaning system. Once the well bore has been conditioned, the rig will then align the flow path to the trip tank. To ensure there is not a drop in hydrostatic pressure during the tripping process, each piece of drill pipe that is pulled from or placed back in the wellbore is counted. Calculations are performed to determine how each piece of drill pipe will affect the fluid volume of the wellbore. This process is generally assigned to someone that will verify the volume of the trip tank has changed the correct amount per each section of pipe pulled wet or dry.

Surge and Swab are other issues that can arise while pulling pipe out or running pipe and casing back in the well bore. The movement of the drill string when pulling pipe out of the well bore can cause the pressure created by the drilling fluid on the bottom of the hole to decrease. This decrease in pressure is caused by friction between the movement of the drill pipe and the stationary drilling mud. This effect is known as swabbing and poses the risk of allowing an influx to enter the well bore. The reverse of swabbing is surging. While running drill pipe or casing into the well bore, the bottom hole pressure can increase, causing a possible fracture in the formation.

Over the past 15 years, tripping has contributed to multiple well control incidents, all of which have the possibility for lost drilling fluids to the environment, injury to personnel, and potential death to personnel. According to a study completed by Bourgoyne Engineering LLC and a team from LSU in July 2017, the total number of recorded well control incidents caused by tripping since 2006 in the U.S. was over 30. (Bourgoyne Engineering LLC, 2017).

The present invention provides a system to monitor and reduce well control incidents and decrease the frequency of safety and environmental incidents attributed to the tripping process. The present invention optimizes the integration of the system with various rig configurations used in the industry today.

SUMMARY OF THE INVENTION

The advanced automated system of the present invention enables the system to closely monitor and maintain the consistency of the hydrostatic pressure of the wellbore throughout the tripping process. The core components of the system include, but are not limited to, an advanced automation system that controls a back-pressure device, including but not limited to a choke, a rotary ball valve, or other flow control devices. The automation system also monitors upstream and downstream flow measurement components. The automation system also monitors the wellhead pressure via a wellhead pressure monitor. The present invention also provides a pump system, such as a mud pump or other pump system, to circulate drilling fluid from the trip tank across the top of the wellhead.

The automation system of the present invention monitors system components and rapidly notifies any abnormalities in trip tank or wellhead parameters. Other features of the system include mitigating effects of surge and swab by applying required pressures to the well and providing the optimal speed to move the drill pipe or casing.

It is an object of the present invention to provide an automated trip system.

It is also an object of the present invention to reduce well control incidents.

It is also an object of the present invention to decrease the frequency of safety and environmental incidents attributed to the tripping or stripping process.

It is also an object of the present invention to decrease the number of safety and environmental incidents attributed to the tripping or stripping process.

It is also an object of the present invention to monitor the hydrostatic pressure of the wellbore.

It is also an object of the present invention to maintain the consistency of the hydrostatic pressure of the wellbore during the tripping process, stripping process, and axial pipe operations.

It is also an object of the present invention to control a back pressure device.

It is also an object of the present invention to monitor upstream and downstream flow.

It is also an object of the present invention to circulate drilling fluid from the trip tank across the top of the wellhead.

It is also an object of the present invention to notify the user of any abnormalities in trip tank parameters.

It is also an object of the present invention to mitigate effects of surge and swab.

It is also an object of the present invention to apply pressure to the wellhead.

It is also an object of the present invention to provide the optimal speed to move the drill pipe and/or casing.

It is also an object of the present invention to protect rig personnel and the environment.

In addition to the features and advantages of the present invention, further advantages thereof will be apparent from the following description in conjunction with the appended drawings.

These and other objects of the invention will become more fully apparent as the description proceeds in the following specification and the attached drawings. These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
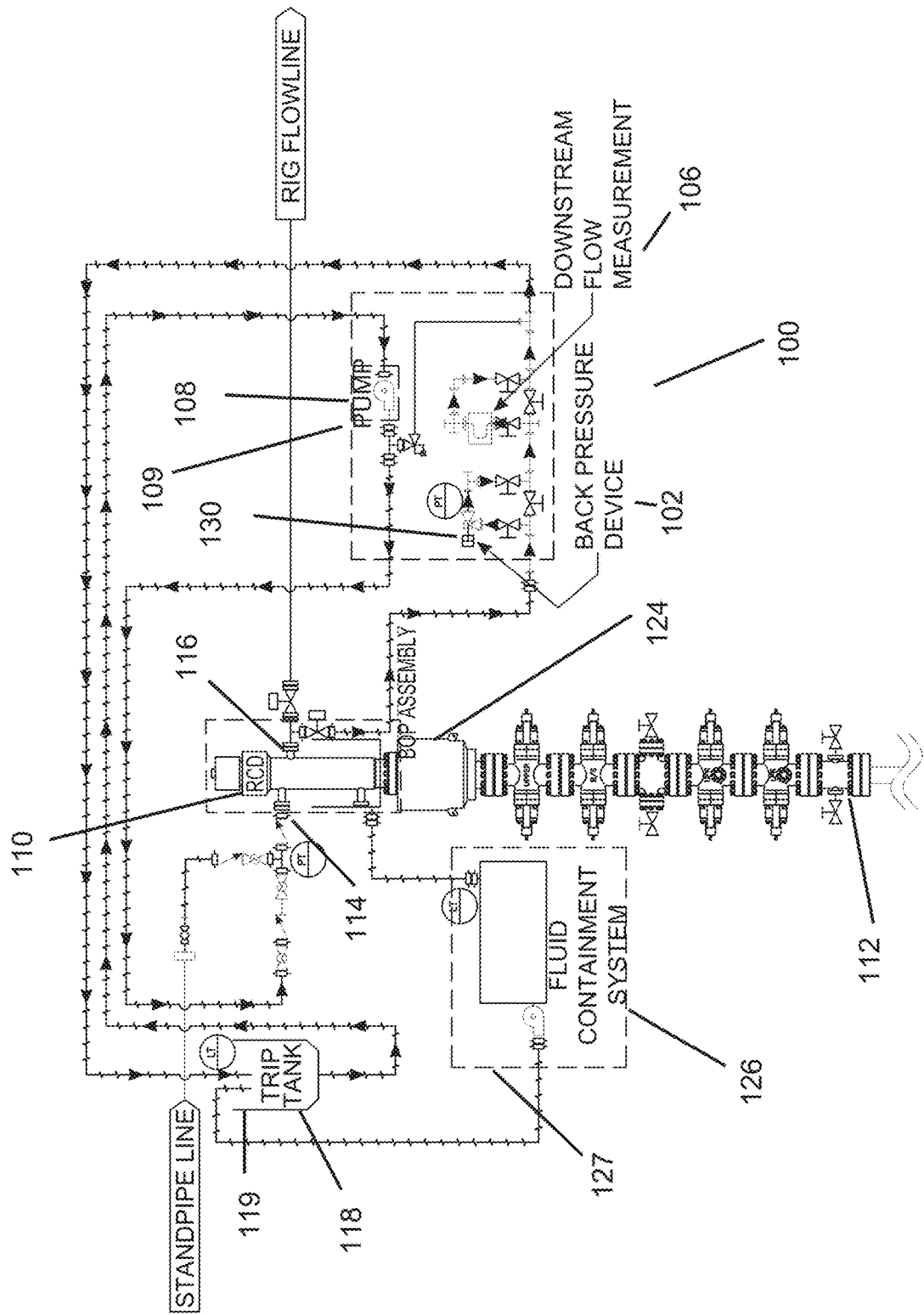
FIG. 1 is a schematic view of one embodiment of the present invention.

The present invention provides an automated trip system generally shown as 100. The automated trip system 100 controls back pressure device 102. The automated trip system 100 also monitors upstream flow component at pump 108, downstream flow component 106, trip tank monitor 119, fluid containment system monitor 127, and wellhead pressure monitor 130.

Figure 2:
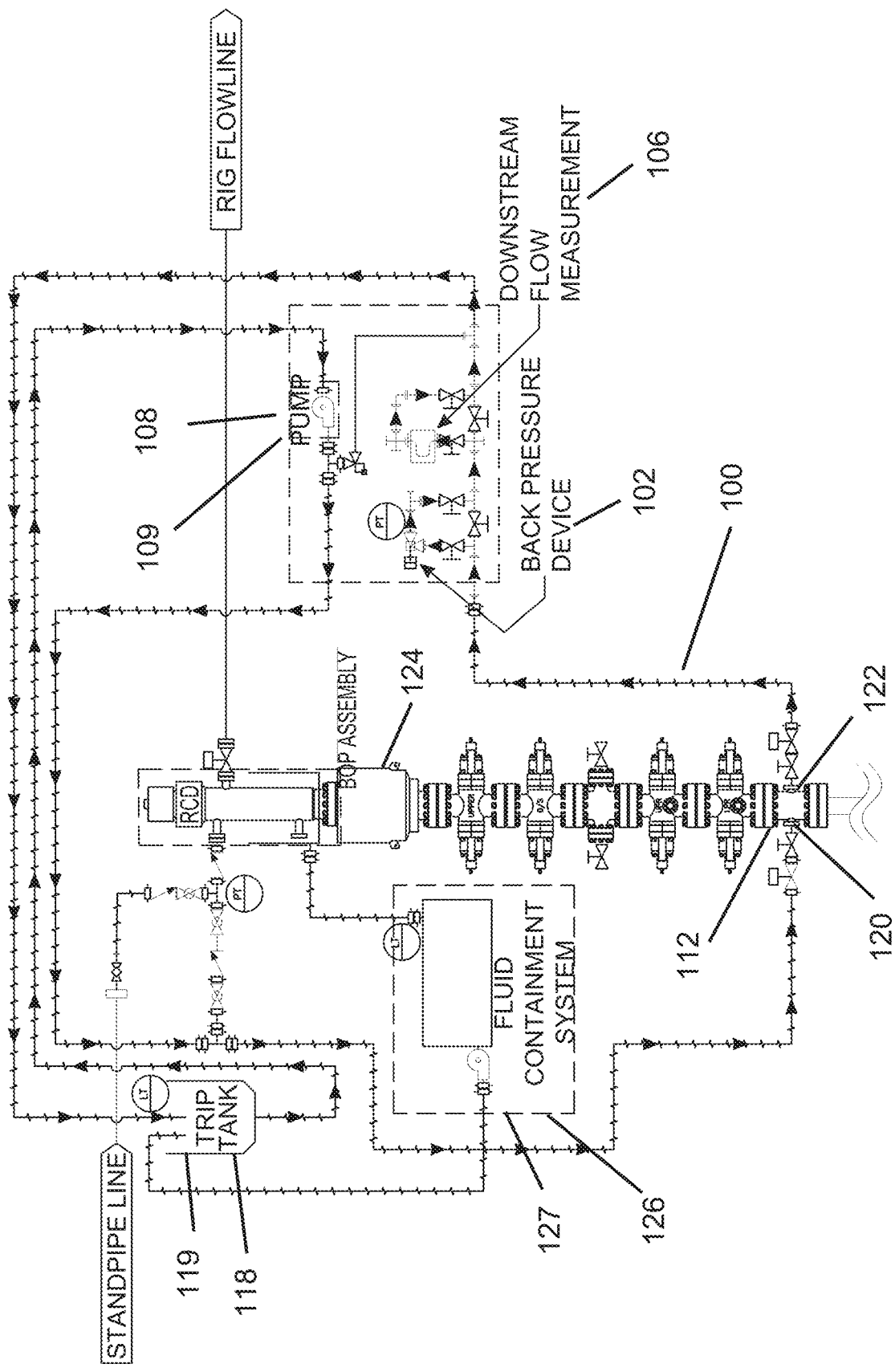
FIG. 2 is a schematic view of one embodiment of the present invention.

The trip system 100 also provides a pump system 108, such as a mud pump or other pumping system. The pump system 108 circulates drilling fluid from the trip tank through the well as shown in FIGS. 1 and 2. The pump system 108 circulates drilling fluid from the trip tank 118 into the well. In one embodiment, the pump system 108 circulates drilling fluid into the well at the RCD 110 or into a lower portion of the well at spool 112, or into the BOP 124. In one embodiment, the pump system 108 circulates drilling fluid into the blowout preventer (BOP) 124 as shown at spool 112. The pump system 108 may alternatively circulate the drilling fluid towards a lower portion of the wellhead.

Tripping pipe, stripping pipe, and other axial pipe operations rely on monitoring the hydrostatic pressure of the wellbore. The hydrostatic pressure is determined by the weight of the drilling fluid column and total vertical depth of the wellbore. The trip system 100 monitors the hydrostatic pressure of the well to determine well conditions and applies pressure to the well. The trip system of the present invention also determines the optimal speed to move the drill pipe and/or casing within the well.

The trip system 100 monitors the trip tank 118 to determine the rate at which the fluid enters and leaves the well. The trip system 100 monitors the trip tank 118 and the active fluid system 126. The trip system 100 detects deviations in the fluid flow to detect and mitigate the deviations more quickly by monitoring the trip tank 118. The trip tank 118 has a much smaller volume than the active fluid system 126. The trip system 100 detects the deviations more quickly by monitoring the status of the trip tank 118 due to the smaller volume of the trip tank 118.

FIGS. 1 and 2 show different flow diagrams of the present invention for circulation of fluid across the well at two different locations for well control. The circulation of the drilling fluid across the well assists with maintaining the hydrostatic pressure of the well under different conditions. The trip system enables circulation of the drilling fluid through an upper portion of the wellhead, such as the RCD 100, or through a lower portion of the wellhead, such as spool 112. FIG. 1 shows the flow of the drilling fluid through the trip system 100 at an upper portion of the wellhead, such as RCD 110, to adjust pressure within the well. FIG. 2 shows the flow of the drilling fluid through the trip system 100 into the BOP 124 at spool 112 to adjust pressure within the well. In one embodiment, the spool 112 may be located below the pipe rams. In other embodiments, the spool 112 may be located at any point below the RCD for circulation of the drilling fluid below the RCD.

The trip system 100 utilizes a trip tank 118 storing at least some of the drilling fluid. The trip tank 118 provides drilling fluid to the trip system. The trip tank 118 also receives drilling fluid from the trip system.

Pump 108 directs the drilling fluid into the well and out of the well. Pump 108 controls the upstream flow of the drilling fluid into the well during the tripping process. The trip system 100 monitors the rate at which the pump 108 is pumping the drilling fluid into the well. The rate at which the pump 108 pumps the drilling fluid into the well from the trip tank 118 provides the trip system 100 with the upstream flow measurement needed for operation of the system 100.

The trip system 100 receives the downstream flow measurement from the downstream flow measurement device 106. The downstream flow measurement device 106 is positioned downstream from the well to measure the flow of the drilling fluid from the well.

The trip system 100 uses the information received from the pump 108 and the downstream flow measurement device 106 to calculate the measurements needed for automation of the system 100. The data received from the pump 108 and the downstream flow measurement device 106 are applied to the calculations for advising operation of the back pressure device 102 or otherwise adjusting the back pressure device 102. These calculations can cause the system 100 to open or close the back pressure device 102 to maintain the pressure within the well or to alleviate pressure deviations in bottom hole pressure.

The system quickly determines potential situations regarding the hydrostatic pressure of the well by monitoring the downstream flow and the upstream flow. The trip system 100 monitors deviations in the circulation of the drilling fluid of the well. For definition within this application, positive deviation will indicate a greater downstream flow measurement than the upstream flow measurement. Negative deviation will indicate a greater upstream flow measurement than the downstream flow measurement. The trip system 100 also monitors potential issues of surging and swabbing.

A negative deviation of the fluid flow indicates the loss of drilling fluid. Such a loss alerts the user to a potential fracture in the well. A positive deviation of the fluid flow indicates a gain of fluid into the system. Such a gain in fluid flow alerts to a potential influx in the well.

The system also provides secondary devices to determine deviations in the fluid flow. The system provides a trip tank monitor 119 to determine the amount of fluid within the trip tank 118. If a positive deviation in the fluid flow occurs, the amount of fluid within the trip tank 118 will increase. If a negative deviation in the fluid flow occurs, the amount of fluid within the trip tank 118 will decrease. In one embodiment, the system establishes a lower volume limit and an upper volume limit. The system detects a negative deviation if the volume of the drilling fluid within the trip tank is below the lower volume limit. The system detects a positive deviation if the volume of the drilling fluid within the trip tank is above the upper volume limit. In one embodiment, the system adjusts the upper volume limit and the lower volume limit based upon the amount of pipe downhole as discussed below.

FIGS. 1 and 2 show the different variations for circulating fluid through the well to reduce deviations in bottom hole pressure. FIG. 1 shows circulation of the fluid within the well at the RCD 110. FIG. 2 shows circulation of the fluid within the well at the spool 112.

Referring to FIG. 1, the trip system 100 adjusts the pressure at the back pressure device 102. Pump 108 directs drilling fluid from the trip tank 118 into the RCD 110 at inlet 114. Drilling fluid flows from the RCD 110 through outlet 116. The drilling fluid flows to a back pressure device 102 after exiting outlet 116. Such a back pressure device 102 may include, but is not limited to, a choke, a rotary ball valve, or other flow control devices.

The drilling fluid flows from the back pressure device to the downstream flow measurement device 106. The flow of the drilling fluid is then measured at the downstream flow measurement device 106. The downstream flow measurement device 106 may be positioned in front of the back pressure device 102 if the downstream flow measurement device 106 is rated for the appropriate pressure.

The drilling fluid flows from the downstream flow measurement device 106 into the trip tank 118. The drilling fluid can then be recirculated through the well from the trip tank 118.

The trip system 100 shown in FIG. 2 applies the pressure below the RCD within the BOP 124. The trip system 100 monitors the upstream and downstream flow measurements via the pump 108 and the downstream flow measurement device 106 as described above. The pump 108 applies the drilling fluid from the trip tank to the inlet 120 of spool 112. The pump 108 circulates the fluid across a portion of the wellhead below the RCD 110. The downstream measurement device 106 determines the downstream flow measurement by measuring the rate at which the drilling fluid exits spool 112 via outlet 122. The drilling fluid flows from the spool 112 to the back pressure device 102 through the downstream flow measurement device 106 to the trip tank 118.

FIGS. 1 and 2 show the drilling fluid being circulated through different areas of the wellhead. One embodiment of the invention provides for circulation of the drilling fluid at the RCD 110 as shown in FIG. 1, to the spool 112 within the BOP 124 shown in FIG. 2, or to both the RCD 110 and the spool 112 as shown in FIGS. 1 and 2.

To maintain the pressure, the trip system adjusts the back pressure device 102. The trip system 100 reduces or otherwise closes the back pressure device 102 to maintain the pressure in instances in which the well is losing pressure. The trip system 100 opens or otherwise increases the opening of the back pressure device 102 to maintain pressure in instances in which the well pressure is increasing. The back pressure device 102 adjusts accordingly to maintain the pressure through the circulation of the drilling fluid through the wellhead at the RCD 110, the spool 112, or both the RCD 110 and the spool 112.

The trip system 100 alerts the user to deviations in the fluid flow. Such deviations in the fluid flow indicate that an issue with the well is occurring. Such issues include, but are not limited to, surging, swabbing, influx, and/or fracture.

The back pressure device 102 opens and closes to maintain the hydrostatic pressure of the wellhead. The trip system 100 monitors the upstream flow of the drilling fluid and the downstream flow of the drilling fluid to determine deviations in the hydrostatic pressure. The trip system 100 then adjusts the back pressure device 102 depending on the deviations determined at the pump 108 and the downstream flow measurement device 106.

To provide additional information, the trip system 100 utilizes a wellhead pressure monitor 130. The wellhead pressure monitor 130 combined with the deviations in fluid flow provide sufficient information to the user in a timely manner to allow the user to be proactive in mitigating the issue. The situation may require closing the well, manipulation of the back pressure device 102, or other actions that may be necessary for continued operation of the well.

Figure 3:
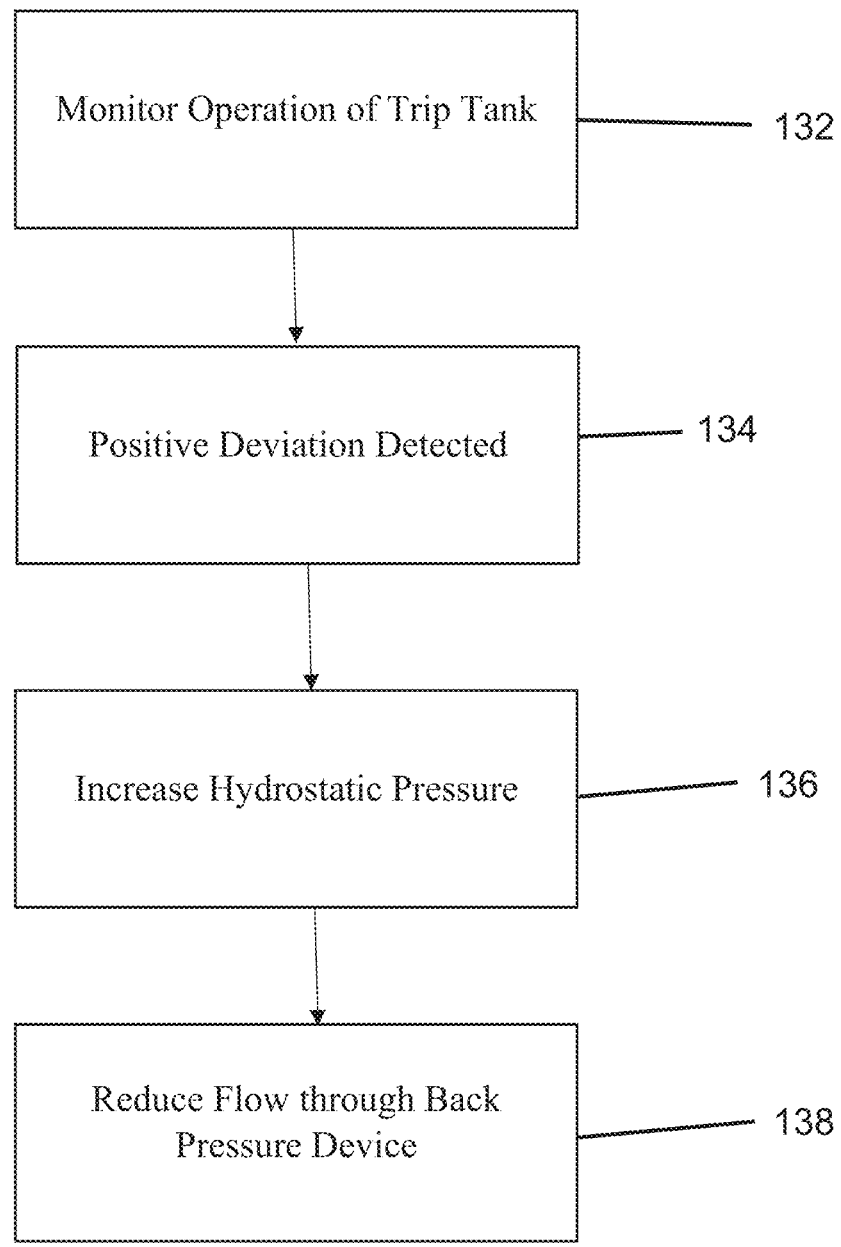
FIG. 3 is a flowchart showing a process of one embodiment of the present invention.
Figure 4:
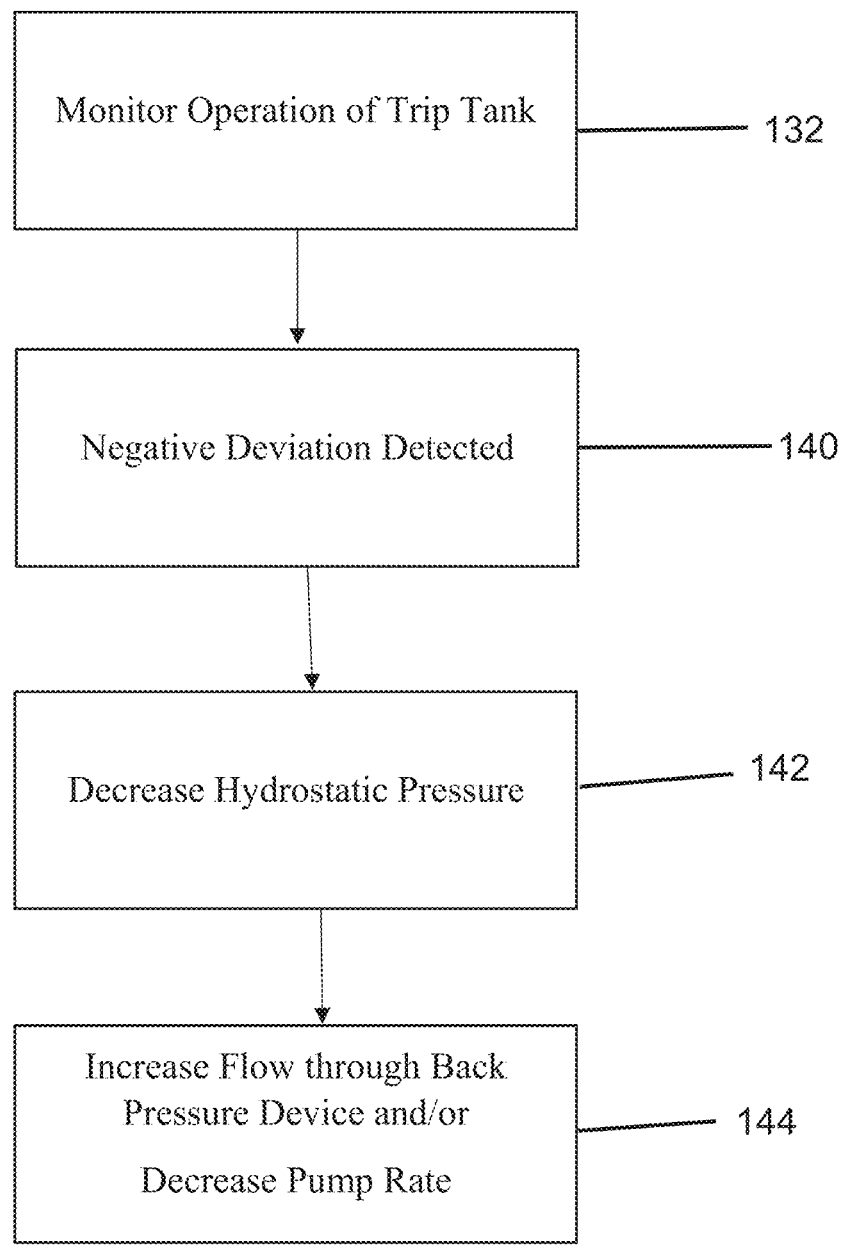
FIG. 4 is a flowchart showing a process of one embodiment of the present invention.
Figure 5:
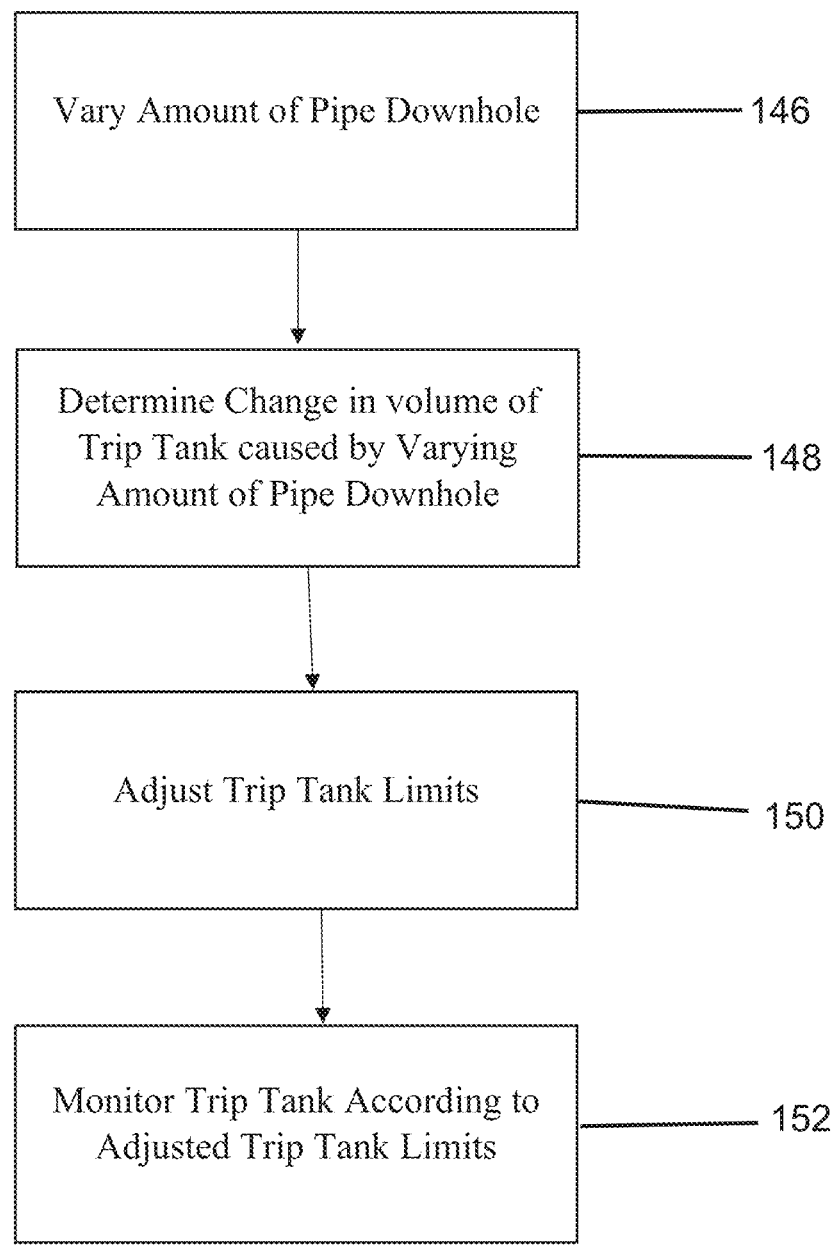
FIG. 5 is a flowchart showing a process of one embodiment of the present invention.

FIGS. 3 and 4 show the operation of the tripping system. The tripping system monitors the operating conditions of the trip tank at Monitor Step 132. Such monitoring involves monitoring the flow rate of the drilling fluid from the trip tank to the annulus (the upstream monitoring), the flow rate of the drilling fluid from the annulus to the trip tank (the downstream monitoring), and/or the volume of the drilling fluid within the trip tank. The system identifies the positive flow deviation of the flow as shown in FIG. 3 and the negative flow deviation as shown in FIG. 4.

To identify the flow deviation, the system provides two different monitoring systems. These alternative systems provide for redundancy in monitoring the operation of the trip tank. The system monitors the trip tank conditions by identifying changes in flow rates and/or monitoring the volume of the drilling fluid within the trip tank.

The system monitors the flow rates of the drilling fluid to and from the trip tank. The system compares the upstream flow measurement to the downstream flow measurement. As indicated above, positive deviation indicates a greater downstream flow measurement than the upstream flow measurement. Negative deviation indicates a greater upstream flow measurement than the downstream flow measurement The system may also monitor the volume of the trip tank. The volume of the trip tank may vary according to the operation of the well. Positive deviation indicates increased volume of the drilling fluid within the trip tank. Negative deviation indicates decreased volume of the drilling fluid within the trip tank. In one embodiment, the tripping system accounts for the amount of pipe downhole as will be discussed below.

The system monitors the operation of the trip tank via at least one of the flow rate comparison or the volume of the drilling fluid within the trip tank. In one embodiment, the tripping system monitors both the flow measurement and the volume of the drilling fluid within the trip tank to provide for redundancy. A computing device and/or system of one embodiment monitors the operating conditions of the trip tank. In one embodiment, the computing device and/or system causes an alarm or other alert to be activated upon detection of positive deviation and/or negative deviation. Such an alert may be an audible alarm, emails, text messages, or other messaging system that alerts the operators.

FIG. 3 shows the operation of the tripping system during detection of positive deviation at Positive Deviation Detected Step 134. The system has identified that the downstream flow measurement is greater than the upstream flow measurement and/or the volume of the drilling fluid is greater than the upper volume limit.

Upon detecting positive deviation at the trip tank, the system identifies that the hydrostatic pressure should be increased at Increase Hydrostatic Pressure Step 136. The system then reduces flow of the drilling fluid through the Back Pressure device at Reduce Flow Step 138. The system may automatically reduce the flow rate through the back pressure device or alert an operator to reduce the flow rate through the back pressure device. Such reduction of the flow rate through the back pressure device may be accomplished by closing the back pressure device or otherwise reducing the flow through the back pressure device.

FIG. 4 shows the operation of the tripping system during detection of negative deviation at Negative Deviation Detected Step 140. The system has identified that the upstream flow measurement is greater than the downstream flow measurement and/or the volume of the drilling fluid is less than the lower volume limit.

Upon detecting negative deviation at the trip tank, the system identifies that the hydrostatic pressure should be decreased at Decrease Hydrostatic Pressure Step 142. The system then increases flow of the drilling fluid through the Back Pressure device and/or decreases the pump rate at Increase Flow Through Back Pressure Device/Decrease Pump Rate Step 138. The system may automatically adjust the back pressure device and/or pump to decrease the hydrostatic pressure or alert an operator to adjust the back pressure device and/or pump. Such increase of the flow rate through the back pressure device may be accomplished by opening the back pressure device or otherwise increasing the flow through the back pressure device.

By monitoring the volume of the drilling fluid within the trip tank, the system identifies potential issues earlier than previously available. The amount of pipe used downhole affects the volume of drilling fluid within the trip tank. The system must adjust the trip tank limits according to the amount of pipe used downhole. As more pipe is used downhole, the pipe will occupy space previously occupied by the drilling fluid. Therefore, more drilling fluid will be within the trip tank when more pipe is used downhole. Likewise less drilling fluid will be in the trip tank when less pipe is used downhole. The system calculates the volume occupied by the pipe used downhole to determine the lower volume limit and the upper volume limit of the amount of drilling fluid within the trip tank.

The amount of drilling fluid within the trip tank should increase as the amount of pipe downhole increases. Likewise, the amount of drilling fluid within the trip tank should decrease as the amount of pipe downhole decreases. The system varies the limits according to the calculations of the volume of the downhole pipe. As more pipe is downhole, the system increases the lower volume limit and the upper volume limit. As less pipe is downhole, the system decreases the lower volume limit and the upper volume limit.

The amount of pipe downhole may increase or decrease as shown at Vary Amount of Pipe Downhole Step 146. The system via computing device and/or computing system of one embodiment, determines the expected change in the volume of the drilling fluid within the trip tank. The system determines the change at Determine Change Step 148. The system, via computing device and/or computing system, adjusts the trip tank limits identifying the expected volume of the drilling fluid within the trip tank required to identify a positive deviation and a negative deviation (the lower volume limit and the upper volume limit).

The system adjusts the lower volume limit and the upper volume limit according to the pipe downhole. The system increases the lower volume limit and the upper volume limit as more pipe is downhole. In one embodiment, the system increases the lower volume limit and the upper volume limit by the change in the amount of volume occupied by the pipe downhole. The system decreases the lower volume limit and the upper volume limit as less pipe is downhole. In one embodiment, the system decreases the lower volume limit and the upper volume limit by the change in the amount of volume occupied by the pipe downhole.

The system then monitors the volume of the drilling fluid within the trip tank according to the adjusted trip tank limits at Monitor Trip Tank Step 152. The system updates the trip tank limits as the amount of pipe varies.

The tripping system identifies potential issues of the well and takes action to potentially avoid and/or minimize the effects of such issues. By monitoring the trip tank, the system identifies potential issues at an earlier stage. Such earlier detection allows drilling personnel or the system to address the issues at an earlier time to potentially avoid and/or minimize the effects of such issues.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A tripping system for maintaining pressure in an annulus during axial movement of drilling pipe in a well, the system comprising:
   a trip tank configure to store drilling fluid, wherein the drilling fluid flows from the annulus to the trip tank, wherein the drilling fluid flows from the trip tank to the annulus;
   an active fluid system configured to store the drilling fluid, wherein the active fluid system is sized larger than the trip tank;
   an upstream flow measurement device that measures flow of the drilling fluid from the trip tank to the annulus;
   a downstream flow measurement device that measures flow of the drilling fluid from the annulus to the trip tank without measuring the flow of the drilling fluid to the active fluid system;
   a back pressure device located downstream from the annulus, wherein the back pressure device opens and closes to adjust the pressure on the annulus.

2. The system of claim 1 further comprising:
   a pump that directs drilling fluid from the trip tank to the annulus.

3. The system of claim 2 further comprising:
   a computing device that detects that the flow rate measured at the upstream flow measurement device is greater than the flow rate measured at the downstream flow measurement device, wherein the computing device instructs decreasing the rate at which the pump directs drilling fluid to the annulus.

4. The system of claim 1 further comprising:
   a volume measurement device measuring the volume of the drilling fluid within the trip tank.

5. The system of claim 4 further comprising:
   a computing device configured to detect if the volume of the drilling fluid within the trip tank is not within a lower volume limit and an upper volume limit, wherein the computing device compensates for a volume of the drilling pipe within the well.

6. The system of claim 5, wherein the computing device generates an alert indicating loss of drilling fluid in the trip tank upon detecting that the volume of the drilling fluid is outside a range of the lower volume limit and the upper volume limit.

7. The system of claim 1 further comprising:
   a computing device that detects that the flow rate measured at the upstream flow measurement device differs from the flow rate measured at the downstream flow measurement device, wherein the computing device generates an alert indicating that the measured flow rates differ.

8. The system of claim 1 further comprising:
   a computing device that detects that the flow rate measured at the upstream flow measurement device is greater than the flow rate measured at the downstream flow measurement device, wherein the computing device instructs increasing flow of the drilling fluid through the back pressure device.

9. The system of claim 1 further comprising:
   a computing device that detects that the flow rate measured at the upstream flow measurement device is less than the flow rate measured at the downstream flow measurement device, wherein the computing device instructs reducing flow of the drilling fluid from the well through the back pressure device.

10. A tripping system for maintaining pressure in an annulus during axial movement of drilling pipe in a well, the system comprising:
    a trip tank wherein drilling fluid flows from the annulus to the trip tank, wherein the drilling fluid flows from the trip tank to the annulus;
    an active fluid system configured to store the drilling fluid, wherein the active fluid system is sized larger than the trip tank;
    a volume measurement device measuring the volume of the drilling fluid within the trip tank;
    a back pressure device located downstream from the annulus, wherein the back pressure device opens and closes to adjust the pressure on the annulus;
    wherein the back pressure device reduces the pressure on the annulus after the volume measurement device measures that the volume of the drilling fluid is below a lower volume limit;
    wherein the back pressure device increases the pressure on the annulus after the volume measurement device measures that the volume of the drilling fluid is above an upper volume limit; and
    a computing device configured to detect if the volume of the drilling fluid within the trip tank is not within the lower volume limit and the upper volume limit, wherein the computing device compensates for a volume of the drilling pipe within the well.

11. The system of claim 10, wherein the computing device generates an alert indicating loss of drilling fluid in the trip tank upon detecting that the volume of the drilling fluid is outside a range of the lower volume limit and the upper volume limit.

12. The system of claim 10, wherein the computing device instructs opening the back pressure device to reduce pressure on the annulus after detecting that the volume of the drilling fluid within the trip tank is below the lower volume limit.

13. The system of claim 10 further comprising:
    a pump that directs drilling fluid from the trip tank to the annulus at a rate;
    wherein the computing device instructs decreasing the rate at which the pump directs drilling fluid to the annulus after detecting that the drilling fluid within the trip tank is below the lower volume limit.

14. The system of claim 10, wherein the computing device instructs closing the back pressure device to increase pressure on the annulus after detecting that the volume of the drilling fluid within the trip tank is above the upper volume limit.

15. A tripping system for maintaining pressure in an annulus during axial movement of drilling pipe in a well, the system comprising:
- a trip tank wherein drilling fluid flows from the annulus to the trip tank, wherein the drilling fluid flows from the trip tank to the annulus;
- an active fluid system configured to store the drilling fluid, wherein the active fluid system is sized larger than the trip tank;
- a volume measurement device measuring the volume of the drilling fluid within the trip tank;
- a back pressure device located downstream from the annulus, wherein the back pressure device opens and closes to adjust the pressure on the annulus;
- a computing device configured to detect if the volume of the drilling fluid within the trip tank is not within a lower volume limit and an upper volume limit;
- wherein the back pressure device opens to reduce pressure on the annulus after the computing device detects that the volume of the drilling fluid within the trip tank is below the lower volume limit;
- wherein the back pressure device closes to increase pressure on the annulus after the computing device detects that the volume of the drilling fluid within the trip tank is above the upper volume limit.

16. The system of claim 15, wherein the computing device increases the lower volume limit and the upper volume limit as an amount of the drilling pipe downhole increases;
- wherein the computing device decreases the lower volume limit and the upper volume limit as the amount of the drilling pipe downhole decreases;
- wherein the computing device instructs opening the back pressure device if the volume of the drilling fluid within the trip tank is below the lower volume limit; and
- wherein the computing device instructs closing the back pressure device if the volume of the drilling fluid within the trip tank is above the upper volume limit.

17. The system of claim 16, wherein the computing device generates an alert indicating loss of drilling fluid in the trip tank upon detecting that the volume of the drilling fluid is outside a range of the lower volume limit and the upper volume limit.

18. The system of claim 15, wherein the back pressure device is a choke.

19. The system of claim 15 further comprising:
- a pump that directs drilling fluid from the trip tank to the annulus at a rate;
- wherein the computing device decreases the rate at which the pump directs drilling fluid to the annulus while the back pressure device opens to reduce the pressure on the annulus after detecting that the drilling fluid within the trip tank is below the lower volume limit.

* * * * *